March 27, 1945. E. KRAUS 2,372,586
PEANUT HARVESTER
Filed April 29, 1943 4 Sheets-Sheet 1
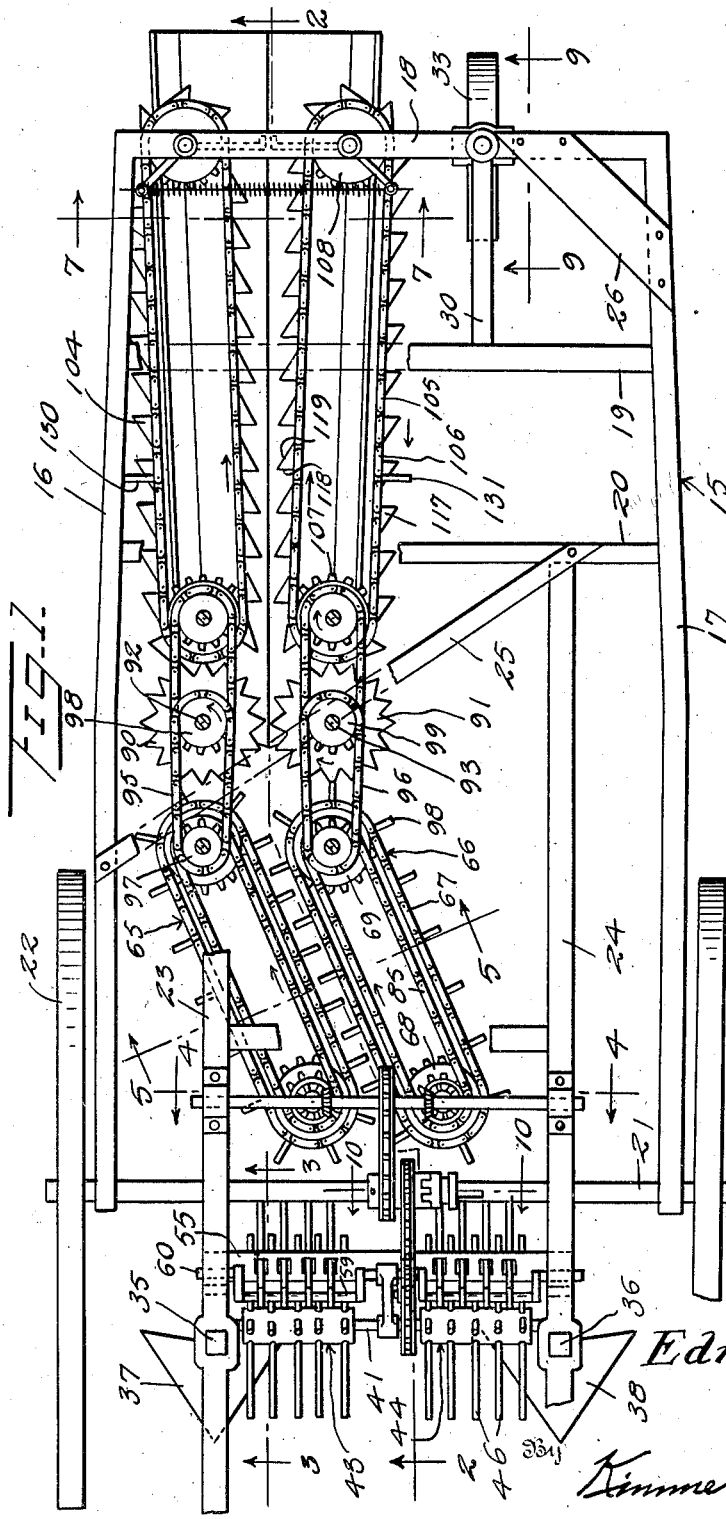
Inventor
Edmund Kraus
By Kimmel & Crowell
Attorneys

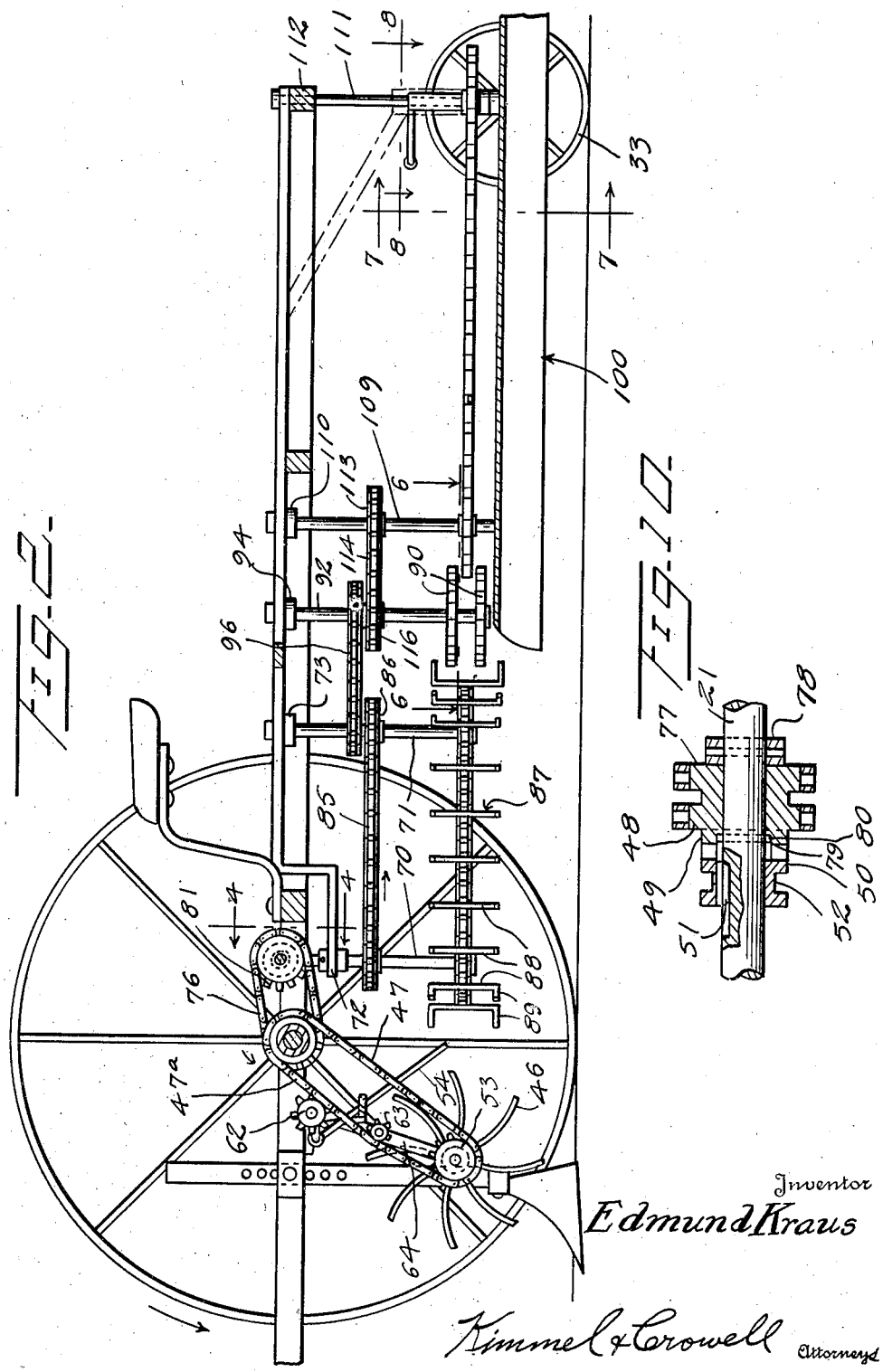

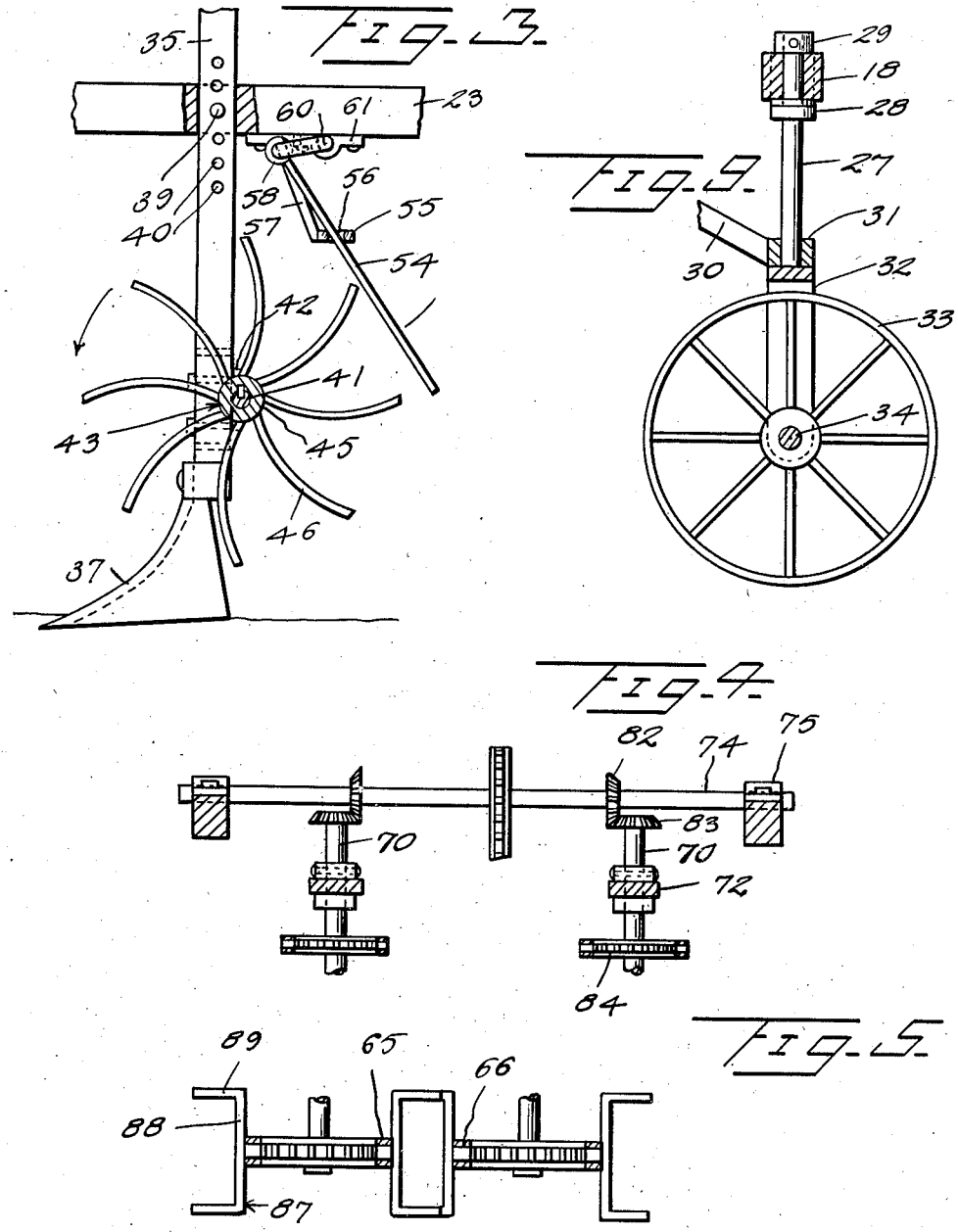

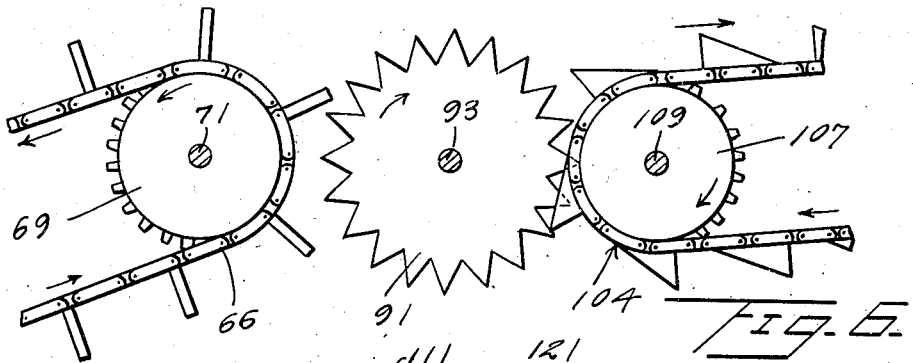
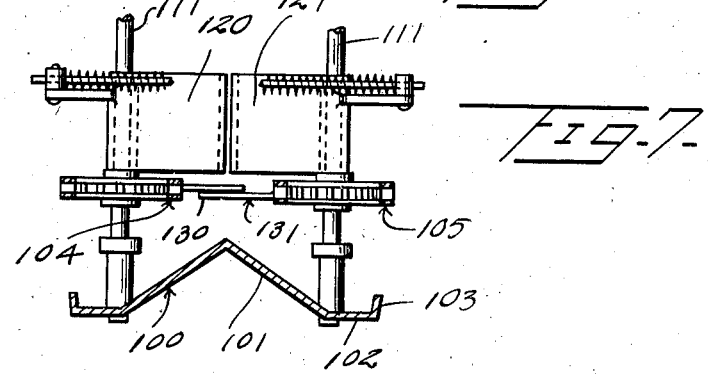
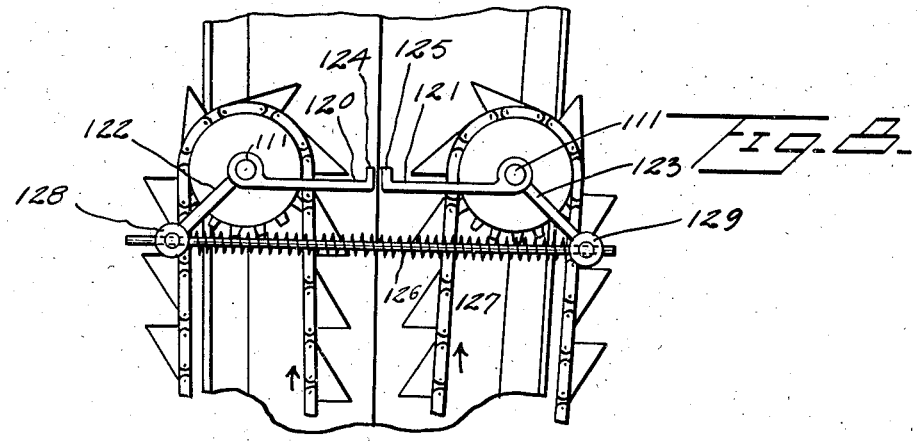

Patented Mar. 27, 1945

2,372,586

UNITED STATES PATENT OFFICE 2,372,586

PEANUT HARVESTER

Edmund Kraus, San Antonio, Tex.

Application March 29, 1943, Serial No. 480,997

11 Claims. (Cl. 55—9)

This invention relates to peanut harvesters.

An object of this invention is to provide a machine for digging the peanuts from at least two rows, conveying the peanuts rearwardly of the machine, and periodically discharging the peanuts in broken elongated piles on top of the ground.

Another object of this invention is to provide a machine of this type which may be coupled to a tractor or may be horsedrawn, the machine collecting the peanuts until a predetermined quantity has been collected and thereupon discharging the peanuts upon the ground, thus facilitating the subsequent collection thereof.

A further object of this invention is to provide a machine of this type embodying a pair of digging plows, rotatable pick-up means for lifting the peanuts including the plants, oscillatable fingers for removing the peanuts from the pick-up means, conveying means for moving the peanuts rearwardly, a guide over which the peanuts are adapted to travel, a rear spring-pressed gate structure for holding and collecting the peanuts on the guide, and opposed fingers carried by a rear conveyor for pushing the peanuts collected on the guide through the gate structure.

To the foregoing objects and others which may hereinafter appear, the invention consists of the novel construction, combination and arrangement of parts as will be more specifically referred to and illustrated in the accompanying drawings, but it is to be understood that changes, variations and modifications may be resorted to which fall within the scope of the invention as claimed.

Figure 1 is a top plan partly broken away of a peanut harvesting attachment constructed according to an embodiment of this invention.

Figure 2 is a sectional view taken on the line 2—2 of Fig. 1.

Figure 3 is a sectional view taken on the line 3—3 of Fig. 1.

Figure 4 is a sectional view taken on the line 4—4 of Fig. 1.

Figure 5 is a sectional view taken on the line 5—5 of Fig. 1.

Figure 6 is a sectional view taken on the line 6—6 of Fig. 2.

Figure 7 is a sectional view taken on the line 7—7 of either Figure 1 or Figure 2.

Figure 8 is a sectional view taken on the line 8—8 of Fig. 2.

Figure 9 is a sectional view taken on the line 9—9 of Fig. 1.

Figure 10 is a sectional view taken on the line 10—10 of Fig. 1.

Referring to the drawings, the numeral 15 designates generally a frame structure including elongated side members 16 and 17 connected together at their rear ends by a connecting bar 18, and connected together intermediate their ends by connecting bars 19 and 20. A transverse drive shaft 21 is journalled in the forward end portions of the side members 16 and 17, and has secured thereto a pair of ground engaging wheels 22. A pair of longitudinal frame members 23 and 24 are disposed within the frame 15, being secured at their rear ends to the transverse frame member 20 and extending forwardly of the drive shaft 21. Suitable draft or coupling means may be secured to the forward ends of the longitudinal members 23 and 24 for connecting the attachment to the rear end of a tractor or for connecting a horse or the like thereto. An angled bracing member 25 is secured at one end to the transverse frame member 20 and extends forwardly and outwardly and is secured to the outer frame member 16. A rear bracing or weight member 26 is secured across the angle or corner formed by the rear frame member 18 and the side frame member 17.

The rear end of the frame 15 is supported by a caster wheel structure including a vertically disposed shaft 27 which is journalled at its upper end through the rear frame member 18, being provided with a lower collar 28 and an upper removable collar 29. A downwardly and rearwardly extending bracing member 30 is secured at its forward upper end to the transverse frame member 19, and is provided at its rear lower end with a bearing 31 through which the vertical shaft 17 is rotatably mounted. A fork 32 is secured to the lower end of the shaft 27, and a wheel 33 is rotatably mounted on a shaft 34 extending between the arms of the fork 32. The longitudinal frame members 23 and 24 have secured thereto vertically disposed plow supporting bars 35 and 36, respectively, which have secured to the lower ends thereof plow members 37 and 38. The plow supporting bars and the plows are of like construction and, as shown in Figure 3, are vertically adjusted relative to the frame 15 by securing bolts 39 which engage through selected openings 40 formed in the plow supporting bars. A picker shaft 41 is journalled in bearings 42 which are secured to the rear sides of the vertical plow supporting bars 36 and 35 and the bearings 42 may be vertically adjusted along the length of the bars 35 and 36 to properly position the shaft 41 with respect to the plows 37 and 38. A pair of rotatable picker members 43 and 44, which are of like construction, are fixed to the shaft 41 between the two plows 37 and 38, and each picker member includes a hub member 45 having secured thereto a plurality of elongated longitudinally curved tines 46. The tines 46 are adapted to pick up the loosened peanut plants, and the loosened plants are adapted to be moved rearwardly of the frame 15 by a conveying means to be hereinafter described.

The shaft 41 is rotated by means of a chain 47 which is trained about a sprocket 48 loosely mounted on the shaft 21. The sprocket 48 has secured to one side thereof one portion of a toothed clutch element 49, and a complementary toothed clutch element 50 is slidable on the shaft 41, being held against rotation by means of a key 51 which is secured to the shaft 21. The clutch element 50 is formed with an annular groove 52 with which a conventional clutch operating collar may be engaged, and the collar may be shifted through a conventional leverage means (not shown). The shaft 41 has secured thereto a sprocket 53 which is disposed between the two picker members 43 and 44 and the shaft 41 is rotated in a counterclockwise direction, as viewed in Figures 2 and 3.

In order to provide a means whereby the peanut plants may be removed from the tines or picking fingers 46, I have provided a plurality of oscillatable fingers or bars 54 which are slidably mounted through a stationary bar 55 having openings 56 through which the bars or fingers 54 loosely engage. The bar 55 is supported below the frame members 22 and 23 by supporting members 57. The upper ends of the bars or fingers 54 are provided with eyes or bearing members 58 which are mounted on the offsets 59 of a crank shaft 60. The crank shaft 60 is journalled in bearings 61 secured to the lower sides of the frame members 23 and 24. A sprocket 62 is secured to the crank shaft 60 between the two offsets 59 and engages the upper or forward run of the chain 47. The forward run 47a of the chain 47 is held in engagement with the sprocket 62 by means of an idler sprocket 63 which is secured to an idler sprocket support 64 supported between the two shafts 41 and 60.

The peanut plants which are removed from the picking tines 46 by the oscillating fingers or bars 54 are thrown rearwardly against a pair of conveying members generally designated as 65 and 66. The conveying members 65 and 66 are of like construction and each includes a chain 67 which is trained about a pair of sprockets 68 and 69. The sprockets 68 and 69 are secured to the lower ends of rotatable shafts 70 and 71, respectively, the shafts 70 and 71 being disposed in a vertical position and journalled in bearings 72 and 73 carried by the frame 15. The shafts 70 and 71 are rotated from a shaft 74 which is journalled in a bearing 75 carried by the upper sides of the frame members 23 and 24. The shaft 74 is disposed rearwardly of the drive shaft 21 and is rotated from the drive shaft 21 by means of a chain 76 which is trained about a second sprocket 77 which is loose on the shaft 21 and is fixed relative to the sprocket 48. A collar 78 is secured to the shaft 21 and holds the double sprocket structure 48 and 77 against endwise movement in one direction. The double sprocket structure may be held against endwise movement in the opposite direction by means of a pin 79 extending through the shaft 21 and projecting at the opposite ends thereof into an annular groove or recess 80 formed in the outer side of the sprocket 48. The chain 76 is also trained about a sprocket 81 which is secured to the shaft 74. The shaft 74 has secured thereto a pair of bevelled gears 82 and a bevelled gear 83 is secured to the upper ends of the two shafts 70 and meshes with an adjacent gear 82.

The shafts 70 also have fixed thereto a sprocket 84 disposed above the sprocket 68, and a chain 85 is trained about the sprocket 84. The shafts 69 have fixed thereto a sprocket 86 disposed above the sprockets 69. The conveyor chains 67 have secured thereto a plurality of U-shaped conveying members 87 which include a vertically disposed bight 88 and outwardly projecting arms 89. The arms 89 comprise the supporting means for supporting the plants and conveying the same rearwardly. The two conveying members 65 and 66 have their adjacent or inner runs disposed in parallel relation, and these inner runs travel rearwardly and angularly with respect to the frame 15, as shown in Figure 1. The plants conveyed by the conveying members 65 and 66 are removed from the supporting members 87 by means of opposed pairs of toothed wheels 90 and 91. The wheels 90 and 91 are mounted on vertically disposed shafts 92 and 93, respectively, which are journalled in bearings 94. The shafts 92 and 93 are rotated by means of chains 95 and 96, respectively, which are trained about sprockets 97 and 98 carried by the rear pair of shafts 71. The chains 95 and 96 also are trained about sprockets 98 and 99 secured to the shafts 92 and 93, respectively. As shown in Figure 2, the rotatable toothed members 90 and 91 are mounted on the lower ends of the supporting shafts, there being two toothed members on each shaft disposed in spaced apart relation and disposed between the arms 89 of the conveying members 87. The toothed members 91 rotate in a clockwise direction, whereas the toothed members 90 rotate in a counter-clockwise direction.

A guide member 100 is disposed below the frame 15, and has the forward end thereof disposed below the pairs of toothed wheels 90 and 91. The guide member 100, shown more clearly in Figure 7, comprises a V-shaped member 101 disposed in inverted position and formed with horizontal outer portions 102 and upwardly directed outer flanges 103. The guide member 100 tapers rearwardly with the smaller end foremost, and is disposed below a pair of conveying members 104 and 105. The conveying members 104 and 105 are disposed in rearwardly divergent relation, and each of the latter conveyors includes a chain 106 which is trained about a pair of sprockets 107 and 108. The sprocket 107 is secured to a vertically disposed shaft 109 journalled in a bearing 110 carried by the frame 15, and the rear sprocket 108 is secured to a vertically disposed shaft 111 journalled in a bearing 112 carried by the frame 15. The shaft 109 has secured thereto a sprocket 113 and a chain 114 is trained about the sprocket 113 and also about a sprocket 115 fixed to the shaft 93. The shaft 92 has a similar sprocket 116 fixed thereto about which a chain 114 is trained, and this latter chain engages a sprocket 113 secured to the second vertical shaft 109 for operating the conveyor 104. The two conveyors 104 and 105 have their inner runs moving rearwardly for moving the plants rearwardly along the guide 100, and each chain 106 has secured to the links thereof outwardly projecting V-shaped blades 117. The blades 117 include a right-angle trailing side 118 and an obtusely disposed leading side 119 which on the inner run of the conveyor is inclined rearwardly and inwardly, so that the blades 117 may slip past the plants on the guide 100 when these plants are collected or held against discharge from the guide 100. The guide 100 also constitutes the bottom wall of a collector on which the plants are accumulated and from which the plants are periodically discharged.

The plants are held against discharge from the guide and collector 100 by means of a pair of swinging gates 120 and 121. The gate 120 is rotatably mounted on the shaft 11 correlated with the rear of the conveyor 104, and the gate 121 is correlated with the rear of the conveyor 105. The gate 120 has secured to the outer end thereof an arm 122 which extends forwardly and outwardly, and the gate 121 has secured thereto an arm 123 which extends forwardly and outwardly therefrom. The gate 120 at its inner end is formed with a right angle flange 124, and the gate 121 is formed at its inner end with a right angle flange 125. The two flanges 124 and 125 are adapted to abut against each other when the gates 120 and 121 are in closed position.

The gates 120 and 121 are constantly urged to a closed position by means of an expansion spring 126 which is mounted on a horizontally disposed guide bar 127. The guide bar 127 is slidably mounted at one end thereof in a guide 128 rotatably carried by the arm 122, and the opposite end of the bar 127 is slidably mounted in a guide 129 rotatably carried by the arm 123. The two gates 120 and 121 are disposed above the conveying members 104 and 105. In order to provide a means whereby the gates 120 and 121 may be moved to an open or discharging position, I have provided a pair of discharging members 130 and 131 which are carried by the conveyors 104 and 105, respectively. The discharging members 130 and 131 are secured to the conveyors 104 and 105 and are of such length as to overlap each other on the inner runs of the conveyors.

In the use and operation of this attachment or machine, the device is adapted to be coupled to the rear of a tractor or, if desired, may be horse drawn. The two plows 37 and 38 are spaced apart a distance equal to the space of two rows of peanuts, so that two rows may be harvested or collected at one time. As the device moves along the ground, the plows 37 and 38 will dig the peanuts, and the lifting or picking members 43 and 44 will raise the peanuts from the ground, reverting the plants. The reverted plants picked up by the picking members 43 and 44 are then thrown rearwardly into the conveyors 65 and 66 by means of the oscillating fingers 54. The plants hang in an inverted position on the horizontal arms 89 of the U-shaped members 87, and are removed from the arms 89 by the rotating pairs of wheels 90 and 91. The plants are removed from the wheels 90 and 91 by means of the blades 117. At this time the peanut plants are moved along the forward end of the combined guide and collector 100, and initially the two gates 120 and 121 will be in closed position under the tension of the spring 126. At each traverse of the conveying members 104 and 105, the discharging or delivering members 130 and 131 will move along the upper side of the guide and collector 100, moving the collected plants rearwardly, and the pressure exerted on the plants by the delivery members 130 and 131 will force the gates 120 and 121 to open so that the collected plants may be discharged upside down in a broken elongated pile at the rear of the guide and collector 100.

After the discharging and delivering members 130 and 131 move to the outer runs of the conveyors 104 and 105, the spring 126 will swing the gates 120 and 121 to their normal closed positions, and during the time that the delivering or discharging members 130 and 131 are moving forwardly on the outer runs of the conveyors 104 and 105, additional plants will be collected on the collector 100. The inclined side 119 of each blade 117 will permit these blades to slide past the plants as they are being collected on the collector 100, so that these blades will not force the plants past the gates 120 and 121. The outer vertical flanges 103 on the outer side of the collector 100 prevent the plants from dropping off of the collector along the longitudinal sides thereof.

This attachment has been designed to facilitate the harvesting of peanuts so that the peanuts may be dug from at least two rows at one time, and these two rows combined into a single row of broken elongated spaced piles with the peanuts uppermost so that the peanuts will be readily dried and cured by the sun, and when cured the peanuts may be more readily collected than where they are merely left on the upper surface of the ground in the same positions they occupied before being dug up.

It will be evident that with certain changes in the supporting structure, the machine hereinbefore described, can be adapted for use in connection with a planter of the conventional type, as an attachment thereto, with the ordinary portions of the planter such as the sweeps or plows, the supporting frame and wheels being retained, thereby saving the necessity of manufacturing certain portions of the hereindescribed unit, although the unit as shown is the preferable form and construction of the invention.

What is claimed is:

1. A peanut harvester comprising a mobile frame, a pair of plows carried by said frame, rotatable pick-up means rearwardly of said plows, oscillatable means for removing the plants from said pick-up means, a combined guide and collector rearwardly of said oscillatable means, means for conveying the plants from said oscillatable means to said guide and collector, means for moving the peanuts lengthwise of said guide and collector, a pair of spring-pressed gates at the rear of said guide and collector normally disposed in closed position, and means carried by said latter means for forcing the collected plants rearwardly to thereby effect opening of said gates and discharge of the plants in an elongated broken pile on the ground.

2. A peanut harvester comprising a mobile frame, a pair of plows carried by said frame, rotatable pick-up means rearwardly of said plows, a collector carried by said frame rearwardly of said pick-up means, means conveying the plants from said pick-up means to said collector, a pair of gates at the rear of said collector, and means for periodically emptying said collector rearwardly through said gates.

3. A peanut harvester comprising a mobile frame, plow means carried by said frame, rotatable pick-up means rearwardly of said plow means, a collector rearwardly of said pick-up means, means conveying the plants from said pick-up means to said collector, said collector including normally closed gate means at the rear thereof, and means effecting periodic opening of said gate means while simultaneously discharging the plants rearwardly from said collector.

4. A peanut harvester comprising a mobile frame, plow means carried by said frame, rotatable pick-up means rearwardly of said plow means, conveying means rearwardly of said pick-up means, and means interposed between said pick-up means and said conveying means for removing the plants from said pick-up means and delivering the plants to said conveying means, said latter means comprising a plurality of oscillatable fingers, and means for oscillating said fingers and spring-controlled means for periodically discharging peanuts from said conveying means.

5. In a peanut harvester, a collector, means conveying the plants to said collector, said means including a pair of endless conveyors disposed in a position with confronting runs thereof moving rearwardly, means normally holding the plants on said collector and between said confronting runs, and means carried by said conveyors engageable with said holding means for periodically discharging the collected plants from said collector.

6. In a peanut harvester, a collector comprising an elongated member having an inverted V-shaped central portion and upturned outer portions, a pair of conveyors having their inner runs movable above said central portion, normally closed gates at the rear end of said elongated member, and means carried by said conveyors for periodically forcing said gates to open position while discharging the plants from said elongated member.

7. In a peanut harvester, a collector comprising an elongated member having an inverted V-shaped central portion and upturned outer portions, a pair of conveyors having their inner runs movable above said central portion, normally closed gates at the rear end of said elongated member, and a projecting member carried by each conveyor, said projecting members being arranged to confront each other on the inner runs of said conveyors to thereby push the collected plants rearwardly and force said gates to swing to open position while simultaneously discharging the plants from said collector.

8. A peanut havester comprising a mobile frame, digging means carried by said frame, a collector carried by said frame rearwardly of said digging means, rotatable pick-up means carried by said frame rearwardly of said digging means, a pair of conveyors rearwardly of said pick-up means, means removing the plants from said pick-up means and delivering the plants to said conveyors, a second pair of conveyors rearwardly of said first pair of conveyors, rotatable toothed members interposed between the adjacent ends of said pairs of conveyors for delivering the plants from said first to said second pair of conveyors, normally closed gates at the rear end of said collector, and means carried by said second pair of conveyors for pushing the collected plants rearwardly and forcing said gates to open position.

9. In a machine of the character described including a frame, digging plows carried by said frame, rotatable pick-up means rearwardly of said plows for lifting the peanuts and the plants, an apertured guide bar, oscillatable fingers engaging through said apertures for removing the peanuts from the pick-up means, conveying means for the peanuts, a guide over which the peanuts are adapted to travel, a rear gate structure for holding and collecting the peanuts on the guide, a rear conveyor and means carried thereby for pushing the peanuts collected on the guide through the gate structure.

10. In a machine of the character described including a frame, digging plows carried by said frame, rotatable pick-up means rearwardly of said plows for lifting the peanuts and plants, an apertured guide bar, oscillatable fingers engaging through said apertures for removing the peanuts from the pick-up means, conveying means for the peanuts, a guide over which the peanuts are adapted to travel, a rear gate structure for holding and collecting the peanuts on the guide, a rear conveyor and means carried thereby for pushing the peanuts collected on the guide through the gate structure, said gate structure being spring pressed.

11. The device as claimed in claim 10 wherein the said pushing means consists of opposed fingers.

EDMUND KRAUS.